Jan. 27, 1970    I. F. MATTHYSSE    3,492,411

STEPPED CABLE SPLICE

Filed Sept. 20, 1967

INVENTOR
IRVING F. MATTHYSSE
BY
ATTORNEYS

United States Patent Office 3,492,411
Patented Jan. 27, 1970

3,492,411
STEPPED CABLE SPLICE
Irving F. Matthysse, Danbury, Conn., assignor to Burndy Corporation, a corporation of New York
Filed Sept. 20, 1967, Ser. No. 669,224
Int. Cl. H02g 15/08
U.S. Cl. 174—88    5 Claims

ABSTRACT OF THE DISCLOSURE

A cable splice joining the individual conductors of a pair of insulated multi-conductor cables including a connector having a plurality of connector elements, such as conductive, malleable metal tubes, supported in axially spaced apart, step-like relationship by supporting elements of dielectric material.

---

This invention relates to a cable splice for multi-conductor cable, and more particularly, to a cable splice adapted to join the conductors of two cables together in spaced relationship.

In splicing the wires or conductors of insulated multi-conductor cable, such as mine cable, it is the usual practice to bare the conductors of each cable at the same point and of the same length and to then join the conductors with tape or individual crimp ferrules. This procedure tends to produce a bulking joint which substantially distorts and undesirably enlarges the cross-sectional configuration of the cable. In addition, the lumped connections tend to cause a serious flexure discontinuity in the cable.

To avoid the formation of such undesirable joints, the procedure of staggering the conductor joints may be used. The difficulty forming such a connection, however, lies in accurately cutting and positioning the joints so as to prevent breaking due to unevenly distributed tensile loads.

In addition, the previously known methods of forming such connections generally require the individual taping of each joint to be certain of insulating one from each other. When dealing with a substantial number of cables, this becomes a tedious and costly procedure; this is especially so since it is necessary to wrap tape around each individual joint as a means for assuring even distribution of tension or bending forces among the several connection points. When dealing with heavily insulated cable, such as mine cable, even the use of tape is usually not sufficient to prevent breaking of individual joints after relatively short times.

Accordingly, it is an object of this invention to provide a cable splice for multi-conductor cable that will separate and insulate cable conductor joints from each other as well as distribute forces among the cable conductors.

Another object of this invention is to provide a cable splice which acts as a template for cutting and forming the cable conductors to proper size.

Another object of this invention is to provide a cable splice which will act as a separator for each conductor joint by rigidly maintaining a proper, desired separation between adjacent joints.

This and other objects and features of this invention will be made more apparent by reference to the following description taken in conjunction with the accompanying drawings, in which.

Figure 1:
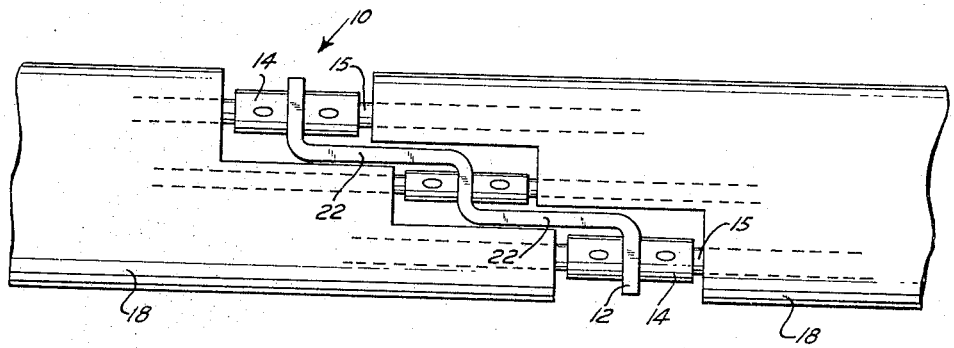
FIGURE 1 is a view of two cables joined together by a cable splice formed in accordance with this invention.

Referring now more particularly to the drawings, reference numeral 10 indicates generally a cable splice having a stepped support bar 12 integrally formed of suitable dielectric material with conductive crimp tubes of ferrules 14 suitably attached in openings 16. Although any suitable fastening means may be used, the ferrules 14 can be preferably press-fitted into the openings 16.

The conductors 15 at the ends of the cables 18 which are to be joined, are inserted into the crimp tubes or ferrules 14. As shown in FIGURE 1, the cable illustrated is of the "mine" cable type having three conductors disposed in substantially coplanar relationship and encased in a dielectric material such as plastic. For purposes of illustration only the stepped bar 12 is shown adapted for use with three conductors cable, although it is apparent that it may be formed to be used advantageously for any number of conductors in excess of one. The stepped bar 12 includes three ferrule-holding elements 20 in which openings 16 are formed to receive the connecting members or ferrules 14. These support elements for the connecting members are connected to each other by parallel support portions 22. By forming the cable splice support bar 12 with additional ferrule holding elements 20 and parallel support portions 22, a splice for any number of conductors may be formed.

In forming the connection of the cables 18, the ends of conductors 15 are first bared and cut in a stepped relationship. To aid in properly preparing the ends, the stepped bar 12 may be used as a template by placing it on the cable ends with the support portions 22 placed longitudinally, parallel to the conductors. By positioning the lowermost ferrule 14 a slight distance in from the cable edge, holding portions 20 will indicate the transverse boundaries for insulation removal from the conductors, while support portions 22 will mark the longitudinal boundaries for removal of the cable jacket insulation. The conductors then may be cut so as to provide bared ends of equal length on each. The second cable insulation may be removed by using the same cable splice in a similar manner.

After the proper amount of insulation has been removed, the splice 10, 12 is positioned between the cables 18 and the conductor ends 15 are inserted into the connector ferrules 14. The ferrules are then crimped as at 24, producing a solid connection with the stepped joints being securely maintained at a set distance from each other.

Figure 2:
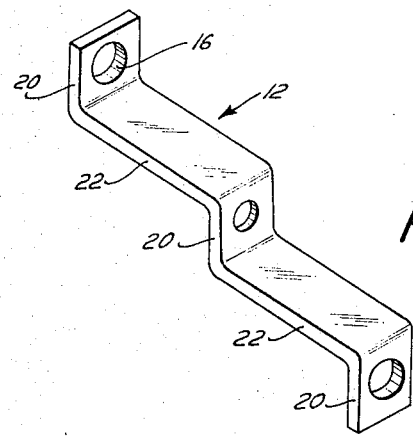
FIGURE 2 is a perspective view of a separator-support element of the cable splice of this invention.
Figure 3:
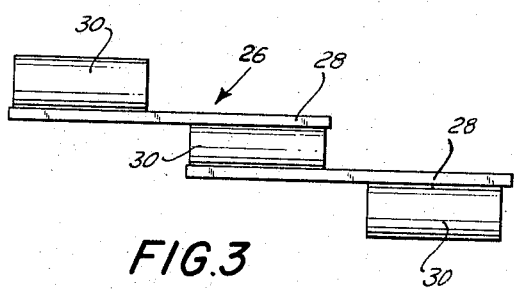
FIGURE 3 is a front elevation view of another embodiment of the cable splice of this invention.
Figure 4:
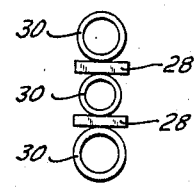
FIGURE 4 is an end-on view of the cable splice of FIGURE 3.

In FIGURES 3 and 4, a splice connector 26 is shown comprising dielectric parallel sections 28 to which are mounted cylindrical conductive crimp ferrules 30 into which the cable ends are placed and then crimped. As in the embodiment of FIGURES 1 and 2, the splice 26 may be formed to accept a greater number of cable ends by adding additional parallel sections 28 and crimping tubes 30. This splice 26 may also readily be used as a template for removal of insulation in a manner similar to the cable splices of FIGURES 1 and 2.

The stepped bars 12 and 28 are preferably made of rigid plastic or rubber although other fairly rigid dielectric materials may be used. The ferrule elements may be formed of any suitable malleable conductive metal or alloy.

There has thus been described a cable splice of simplified construction, which is easy to use and which will maintain the conductor joints in desirable fixed positions relative to each other while distributing tensile and bending forces uniformly among all of the conductors and connection points.

The invention has thus been described, but it is desired to be understood that it is not confined to the particular forms or usages shown and defined, the same being merely illustrative, and that the invention may be carried out in other ways without departing from the spirit of the invention and by means of which objects of this invention are attained and new results accomplished, as it is obvious that the particular embodiments herein shown and described are only some of the many that can be employed to obtain these objects and accomplish these results.

What is claimed is:

1. A cable splice connecting a pair of insulated multiconductor cables wherein the bared ends of the conductors of each cable are arranged in an axially, spaced apart stepped relationship, said splice including a plurality of connecting members joining opposed pairs of conductor ends, from said pair of cables, and a support member formed of dielectric material having a substantially stepped shape including a first subportion extending substantially parallel to the axes of said cables and second subportions extending from said first subportion in axially spaced apart stepped relationship having said connector members affixed thereto.

2. The cable splice of claim 1 wherein said connecting members are conductive tubes of malleable metal crimped to said conductors.

3. The cable splice of claim 1 wherein said first subportion and said second subportions are integrally formed of a dielectric material.

4. A cable splice connecting a pair of insulated multiconductor cables wherein the bared ends of the conductors of each cable are arranged in an axially, spaced apart stepped relationship, said splice including a plurality of connecting members joining opposed pairs of conductor ends, from said pair of cables, and a plurality of parallel support members of dielectric material extending between adjacent ones of said connecting members in axially spaced apart relationship having adjacent ones of said connecting members affixed to opposite ends thereof, whereby said supporting members maintain said connecting members in axially spaced apart stepped relationship.

5. The cable splice of claim 4 wherein said connecting members are conductive tubes of malleable metal crimped to said conductors and said conductive tubes are attached to said parallel support members.

References Cited

UNITED STATES PATENTS

| | | | |
|---|---|---|---|
| 3,200,191 | 8/1965 | Davies et al. | 174—88 |
| 3,317,658 | 5/1967 | Smith | 174—88 XR |

DARRELL L. CLAY, Primary Examiner

U.S. Cl. X.R.

29—628; 174—90; 339—217, 221, 276